United States Patent
Shu et al.

(10) Patent No.: US 8,825,595 B2
(45) Date of Patent: Sep. 2, 2014

(54) METHOD AND AN APPARATUS FOR MAINTAINING A DATABASE CONTAINING INFORMATION ON FREQUENCY SPECTRUM USAGE

(75) Inventors: Kodo Shu, Beijing (CN); Jussi Kahtava, Tokyo (JP); Ilkka Niva, San Jose, CA (US); Pekka Ojanen, Espoo (FI)

(73) Assignee: Nokia Corporation, Espoo (FI)

( * ) Notice: Subject to any disclaimer, the term of this patent is extended or adjusted under 35 U.S.C. 154(b) by 72 days.

(21) Appl. No.: 13/499,673

(22) PCT Filed: Oct. 5, 2009

(86) PCT No.: PCT/FI2009/050798
§ 371 (c)(1),
(2), (4) Date: Mar. 30, 2012

(87) PCT Pub. No.: WO2011/042590
PCT Pub. Date: Apr. 14, 2011

(65) Prior Publication Data
US 2012/0185429 A1    Jul. 19, 2012

(51) Int. Cl.
G06F 7/00      (2006.01)
G06F 17/00     (2006.01)
H04W 24/08     (2009.01)
H04W 16/14     (2009.01)

(52) U.S. Cl.
CPC .............. *H04W 24/08* (2013.01); *H04W 16/14* (2013.01)
USPC ........ 707/609; 370/235; 370/236; 370/236.1; 370/237

(58) Field of Classification Search
USPC ................ 707/609; 370/235, 236, 236.1, 237
See application file for complete search history.

(56) References Cited

U.S. PATENT DOCUMENTS 7,133,378 B2 * 11/2006 Kashiwagi et al. ........... 370/328
7,406,319 B2    7/2008 Kostic et al.
(Continued)

FOREIGN PATENT DOCUMENTS

CN    1672450 A    9/2005
CN    101465685 A  6/2009
(Continued)

OTHER PUBLICATIONS

Filin et al., "IEEE Draft Standard P1900.4a for Architecture and Interfaces for Dynamic Spectrum Access Networks in White Space Frequency Bands: Technical Overview and Feasibility Study", IEEE 21st International Symposium on Personal, Indoor and Mobile Radio Communications Workshops, Sep. 26-30, 2010, pp. 15-20.
(Continued)

*Primary Examiner* — Hares Jami
(74) *Attorney, Agent, or Firm* — Harrington & Smith

(57) ABSTRACT

There is disclosed a method, apparatus and a computer code to maintain databases. In the method a first database containing information of a usage of a frequency spectrum is maintained for a first geographical area by the apparatus. Information is received from a second database apparatus on a second geographical area. The first database apparatus determines whether said first geographical area and said second geographical area are at least partly overlapping. A linkage table is maintained to provide an indication on the result of the determination, wherein said indication is indicative of whether said first geographical area and said second geographical area are at least partly overlapping.

17 Claims, 16 Drawing Sheets

(56) References Cited

U.S. PATENT DOCUMENTS

| | | | |
|---|---|---|---|
| 2002/0098870 A1 | 7/2002 | Kashiwagi et al. | 455/561 |
| 2003/0198200 A1* | 10/2003 | Diener et al. | 370/329 |
| 2004/0087310 A1* | 5/2004 | Williamson et al. | 455/450 |
| 2006/0143111 A1 | 6/2006 | Mylet | |
| 2009/0163223 A1* | 6/2009 | Casey | 455/453 |
| 2011/0255470 A1* | 10/2011 | Fukami | 370/328 |

FOREIGN PATENT DOCUMENTS

| | | |
|---|---|---|
| GB | 2391347 A | 2/2004 |
| RU | 94028275 | 6/1996 |
| RU | 94028275 A | 6/1996 |
| WO | WO-2004/016022 A1 | 2/2004 |
| WO | 2008/062249 A1 | 5/2008 |
| WO | 2008/109641 A2 | 9/2008 |

OTHER PUBLICATIONS

Hwang et al., "A Novel GPS-Based Quorum Hybrid Routing Algorithm (GPS-QHRA) for Cellular-Based Ad Hoc Wireless Networks", Journal of Information Science and Engineering, vol. 21, Jan. 2005, pp. 1-21.

Brik et al., "DSAP: A Protocol for Coordinated Spectrum Access", IEEE Dynamic Spectrum Access Networks, Nov. 10, 2005, 4 pages.

"Working Document Towards a Preliminary Draft New Report on Cognitive Radio in Land Mobile Service", SDR Forum, R-0001, V1.0.0, Jan. 24, 2008, 21 pages.

International Search Report and Written Opinion received for corresponding International Patent Application No. PCT/FI2009/050798, dated Jun. 18, 2010, 13 pages.

Gurney et al., "Geo-Location Database Techniques for Incumbent Protection in the TV White Space", 3rd IEEE Symposium on New Frontiers in Dynamic Spectrum Access Networks, Oct. 14-17, 2008, pp. 1-9.

Office Action received for corresponding Russion Application No. 2012117961, dated Aug. 22, 2013, 6 pages.

* cited by examiner

METHOD AND AN APPARATUS FOR MAINTAINING A DATABASE CONTAINING INFORMATION ON FREQUENCY SPECTRUM USAGE

This application was originally filed as PCT Application No. PCT/FI2009/050798 filed Oct. 5,2009.

TECHNICAL FIELD

This invention relates to the coordination mechanism and the interface between databases relating to white space devices.

BACKGROUND INFORMATION

Wireless communication using electromagnetic radiation e.g. radio and TV broadcasts needs a certain band of the available frequency spectrum. Using these bands is regulated by national and international bodies which assign frequency bands for specific uses, and in many cases license the rights to these. This frequency allocation process creates a band plan, which for technical reasons may assign unused spectrum between used transmission bands or channels to avoid interference. In this case, while the frequencies are unused, they have been specifically assigned for a purpose, such as a guard band. These unused spectrum may exist naturally between used channels, as assigning nearby transmissions to immediately-adjacent channels may cause disturbing interference to both.

As well as these technical assignment, there is also unused radio spectrum which has either not been in use, or is becoming free as a result of technical changes. In particular, the planned switchover to digital television may free up large areas within certain frequency range. This is because digital transmissions can be packed into adjacent channels, while analog ones cannot. This means that the band can be "compressed" into fewer channels, while still allowing for more transmissions.

In the United States, the Federal Communications Commission (FCC) has issued a ruling to allow devices that satisfy some conditions/requirements to be able to access the TV bands, which are un-used at a specific place and at a specific time. This part of TV spectrum is called White Space (WS). A device intended to use these available channels is a whitespace device (WSD). These devices may be designed to detect the presence of existing signals, such as TV stations and other wireless users, and to then avoid the use of these channels. Early ideas proposed including GPS receivers and programming each white space device with a white space database (WS DB) of all TV stations in an area, however this would not have avoided other non-stationary or unlicensed users in the area, or any stations licensed or altered after the device was made.

A white space device generally needs to have the following capabilities: it is aware of or capable to determine its location (geographical location); it has access to a white space database, which contains the latest spectrum usage information with respect to places; it is able to detect occupation of the bands within the white space frequency spectrum (Sensing), etc.

Usually a white space device may need to possess the latest information of the white space database relevant to its location and transmits at proper frequency bands according to the latest white space database information. There may be multiple white space databases and each of them may contain the spectrum usage information for several areas.

SUMMARY

This application discloses a coordination mechanism between multiple databases that have communication links and correspondent interfaces to connect with each other. Coordination among the databases may focus on the following aspects:

1. Sharing of Access Load to the Database

Multiple databases communicate with each other and build a linkage table that contains the information of corresponding databases for sharing. The database monitors the access load from white space devices with an overload trigger. When it is detected that the trigger is activated, the database negotiates with the other corresponding databases. This negotiation may lead to databases agreeing on the amount of access load to be re-routed from the overloaded database to other databases.

2. Sharing or Cross-Checking of Calculation Data and/or Spectrum Usage Information Multiple databases communicate with each other and build a linkage table that contains the information of corresponding databases for sharing and cross-checking. The areas for sharing and/or cross-checking are marked and stored in a linkage table. The database calculates available channels associated with geographical locations in its areas and sends out the calculation data in the marked areas to the corresponding databases according to the linkage table. The other corresponding database confirms the received calculation data.

3. Sharing of Spectrum Resources in the Overlapping Areas

Multiple white space databases check whether there are overlapping areas by using geographical location information. All overlapping areas are marked and the results are used to build a linkage table. Databases communicate with each other based on the linkage table and split spectrum resources randomly or evenly among multiple databases for the overlapping areas. For the overlapping areas, the database may also request that the access point (AP) in that area reports its spectrum use activity (e.g., the number of connected or idle white space devices in its coverage area). Based on the reported load, databases communicate with each other and share spectrum resources in proportion to the spectrum use activity at the access points.

According to a first aspect of the present invention there is provided a method comprising:
  maintaining a first database containing information of a usage of a frequency spectrum for a first geographical area by a first database apparatus;
  receiving information from a second database apparatus on a second geographical area;
  determining by the first database apparatus whether said first geographical area and said second geographical area are at least partly overlapping;
  maintaining a linkage table in which an indication is provided on the result of the determining.

According to a second aspect of the present invention there is provided an apparatus comprising:
  means for communicating with a first database containing information of a usage of a frequency spectrum for a first geographical area;
  means for receiving information from a second database apparatus on a second geographical area;
  means for determining whether said first geographical area and said second geographical area are at least partly overlapping; and means for maintaining a linkage table in which an indication is provided on the result of the determining.

According to a third aspect of the present invention there is provided a server comprising:
- a first database containing information of a usage of a frequency spectrum for a first geographical area;
- means for receiving information from a second database apparatus on a second geographical area;
- means for determining whether said first geographical area and said second geographical area are at least partly overlapping; and
- means for maintaining a linkage table in which an indication is provided on the result of the determining.

According to a fourth aspect of the present invention there is provided an apparatus comprising:
- an interface for communicating with a first database containing information of a usage of a frequency spectrum for a first geographical area;
- a transceiver for communicating with a second database apparatus on a second geographical area to receive information from the second database apparatus;
- a controller for determining whether said first geographical area and said second geographical area are at least partly overlapping and for maintaining a linkage table in which an indication is provided on the result of the determining.

According to a fifth aspect of the present invention there is provided a computer program product comprising a computer program code configured to, with at least one processor, cause an apparatus to:
- maintain a first database containing information of a usage of a frequency spectrum for a first geographical area;
- receive information from a second database apparatus on a second geographical area;
- determine whether said first geographical area and said second geographical area are at least partly overlapping; and
- maintain a linkage table in which an indication is provided on the result of the determining.

Coordination (including all three aspects mentioned above) can be done between the databases according to the linkage table and only relevant databases may be involved. The over-loading issue due to an over-whelming access to certain specific databases may be solved with the load-balancing between databases. The integrity of the calculation data can be cross-checked and the overall calculation load for a large area can be actually shared by multiple databases. With spectrum sharing at the overlapping areas, less interference between access points may also be achieved because frequency bands (channels) can be pre-assigned or assigned based on loading in a frequency division multiple access (FDMA) fashion between different databases or different access points.

DESCRIPTION OF THE DRAWINGS

In the following some example embodiments of the invention will be descried in more detail with reference to the appended figures, in which.

DETAILED DESCRIPTION OF SOME EXAMPLE EMBODIMENTS

Figure 10A:
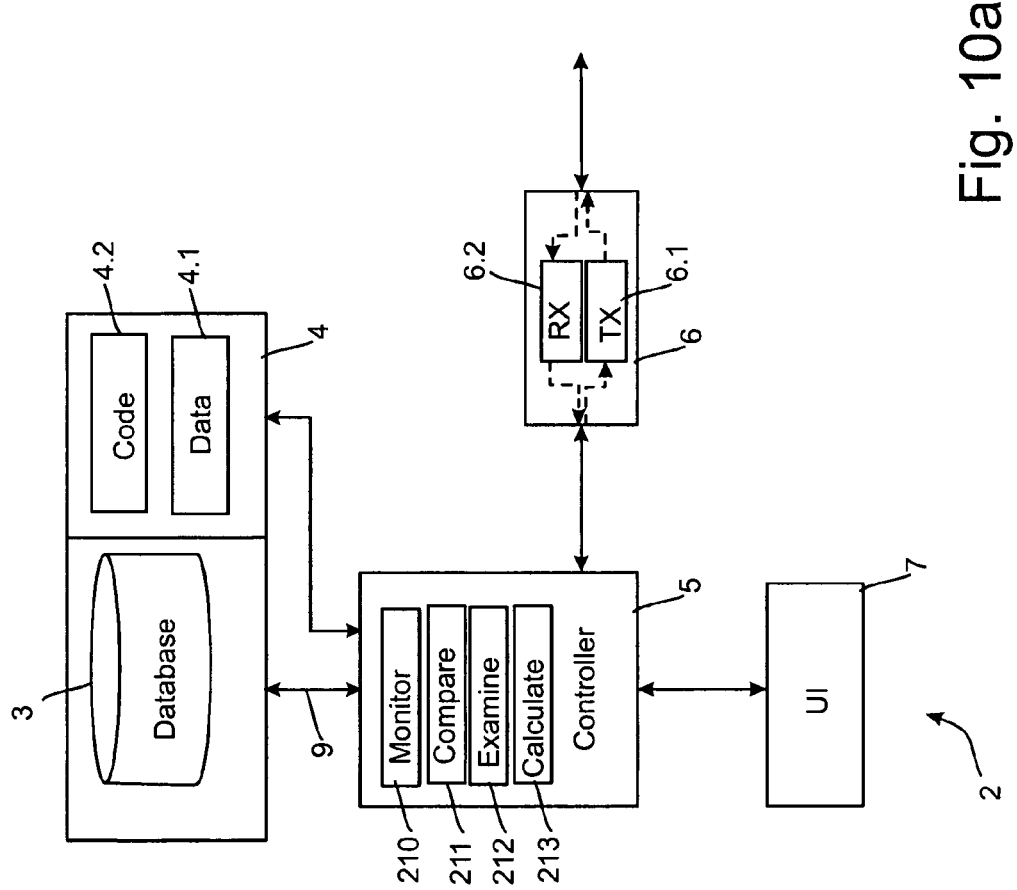
FIG. 10a depicts an example embodiment of a database apparatus.
Figure 10B:
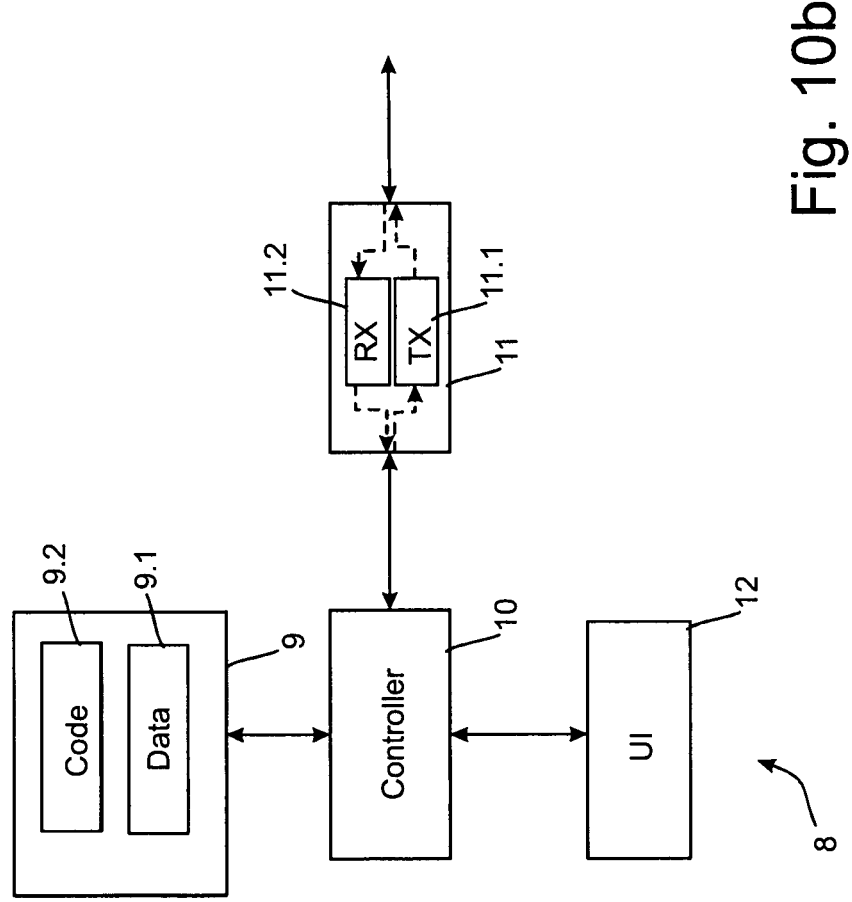
FIG. 10b depicts an example embodiment of a regulator apparatus.
Figure 10C:
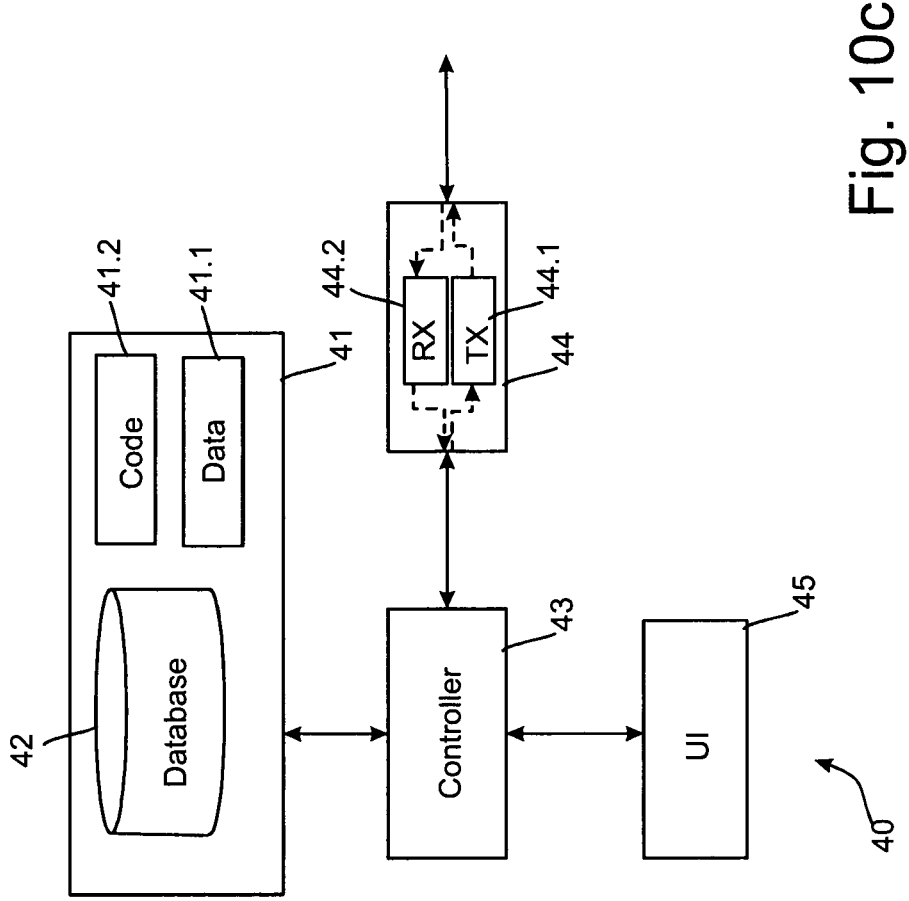
FIG. 10c depicts an example embodiment of a usage database apparatus.

In the following an example embodiment of a system in which the present invention can be implemented is described in more detail with reference to FIGS. 1a and 1b. Some of the apparatuses which can be used in the system are depicted in FIGS. 10a, 10b and 10c. The system 1 comprises database apparatuses 2. An example embodiment of the database apparatus 2 is depicted in FIG. 10a. The database apparatus 2 comprises a database 3 which contains information relating to the spectrum usage within a geographical area G. There can be a number of communication stations ST in the geographical area G which are not white space devices. For example, there can be TV- and/or radio broadcasting stations, base stations of a mobile communication system, communication stations of authorities, etc. which may have privilege on using certain channels of a frequency spectrum.

It should be noted here that there can be a number of database apparatuses 2 and other elements in the system. FIG. 1a depicts as a non-limiting example three database apparatuses 2.1, 2.2, 2.3 and four areas A.1, A.2, A.3, A.4. The reference numerals with dots (e.g. 2.1, 2.2, 2.3, A.1, A.2) is used when a specific element is referred to and the reference numeral without the dot plus number is used when a certain element in general is referred to (e.g. a database apparatus 2/the database apparatus 2, a database 3/the database 3, an area A/the area A).

There may be multiple database apparatuses 2 comprising or having access to one or more databases 3 and each database 3 may contain the spectrum usage information for several areas. These areas of different databases 3 may overlap with each other partially or even completely. Here the database 3 refers to a white space database in connection with an apparatus 2 that has one or more interfaces with authorization bodies (regulator) and information-providing entities (e.g. TV broadcasting and Wireless microphone). In addition, the database apparatus 2 has data calculation capability to calculate what channels are available at certain geographical locations.

This scenario can be possible because it may be very costly to build a white space database to cover a huge area. One possible solution according to an example embodiment of the present invention is to have multiple databases 3 and each database 3 may cover some parts of area and these databases 3 can cooperate with each other to share spectrum information and calculation data for serving the whole area and/or to share the access load among the white space databases. It is also possible that multiple countries may contain multiple databases 3 and these countries may have adjacent boarders. These databases 3 can cooperate with each other to share spectrum information for serving the area near the boarders.

As an example of sharing access load, a first database 3.1 and a second database 3.2 contain the spectrum information for several areas. It may happen that the amount of white space devices having access to the first database 3.1 is much more than those that have access to the second database 3.2. The first database 3.1 may then be overloaded by the accesses from the white space devices 13. The second database 3.2 may be able to share some load from the first database 3.1 if there is an agreement between the first database 3.1 and the second database 3.2.

Furthermore, in overlapping areas of databases 3, it may be beneficial to use a coordination mechanism to share spectrum resources between the databases 3. For example, if in an overlapping area of the first database 3.1 and the second database 3.2, the number of active white space devices 12 querying first database 3.1 is much higher than that of devices querying the second database 3.2, the available channels for the overlapping area X can be split between the first database 3.1 and the second database 3.2 in a way that the first database 3.1 gets more channels to indicate available for queries than the second database 3.2.

Figure 1A:
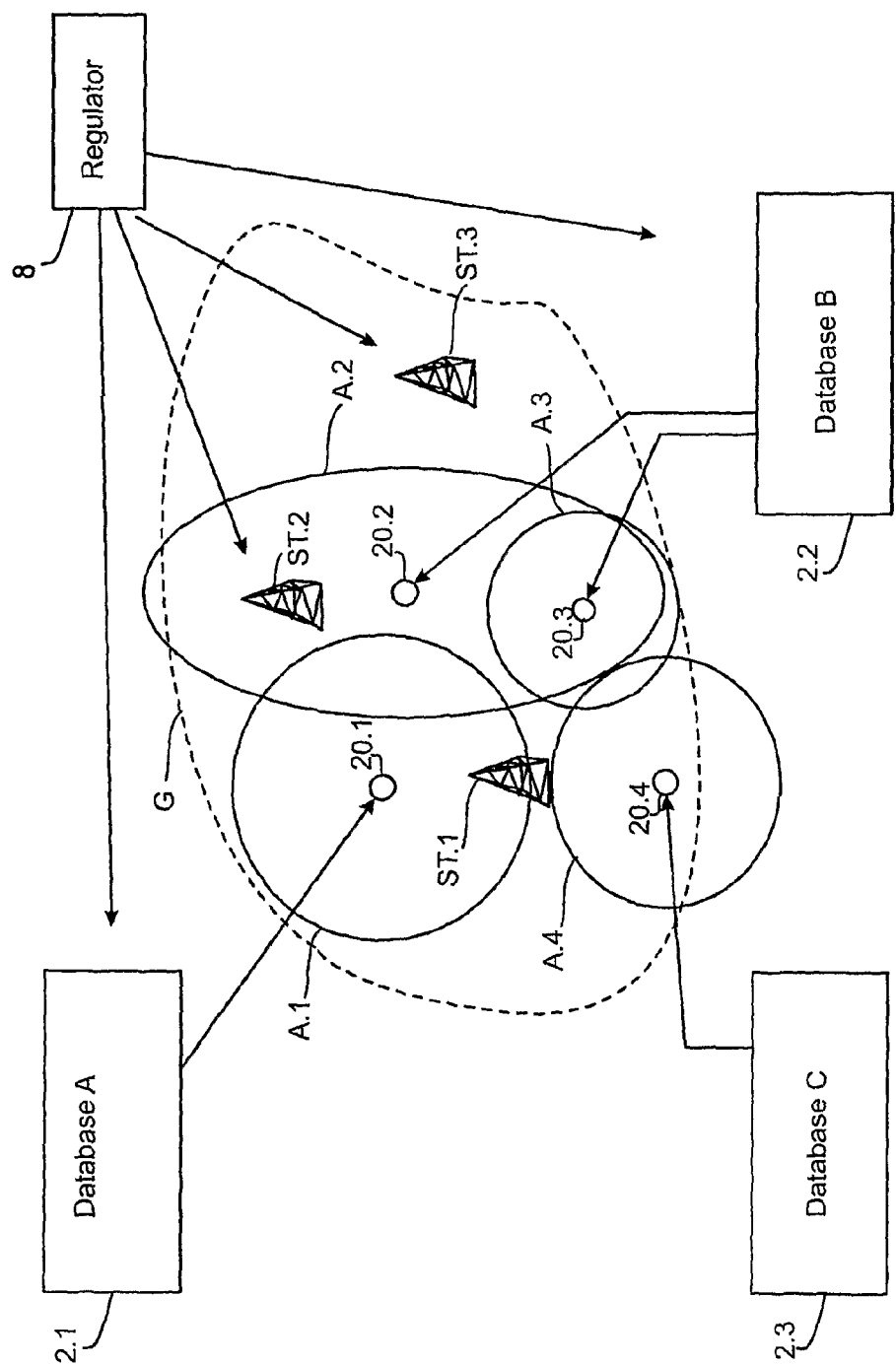
FIG. 1a illustrates an example of a geographical area divided into areas.
Figure 1B:
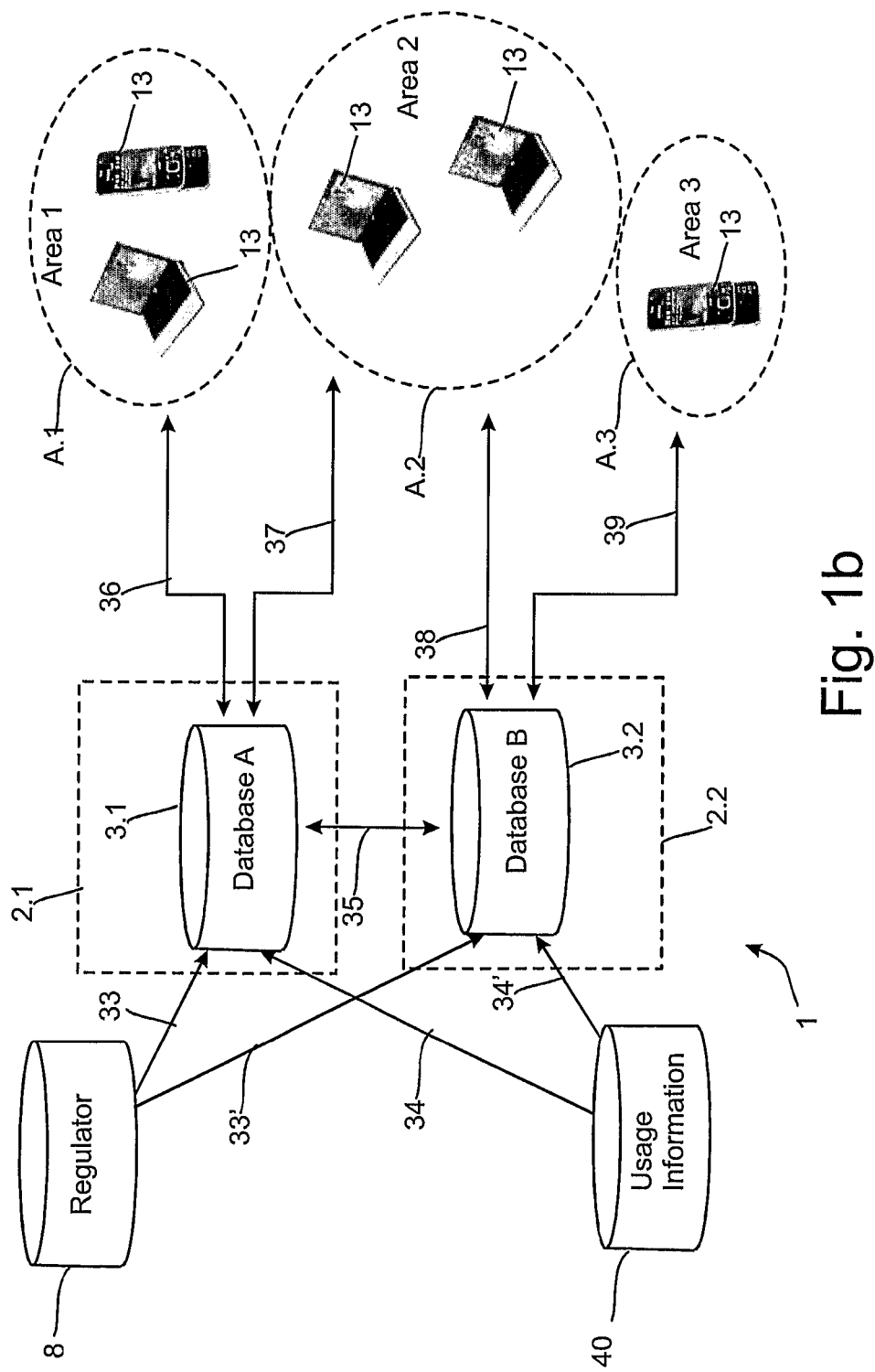
FIG. 1b illustrates generic network architecture.

The example of the geographical area G depicted in FIG. 1a comprises a number of areas served by access point apparatuses 20. In this example there are four access point apparatuses 20.1-20.4 but in practical implementations there can be less or more than four access point apparatuses 20. Each access point apparatus 20 can serve a certain geographical area wherein a white space device 13 which is located within such area may be able to communicate with the access point apparatus 20 of that area. As can be seen from FIG. 1a some areas may be overlapping. Hence, a white space device 13 may be able to communicate with more than one access point apparatus 20.

There is also a number of database apparatuses 2 which contain or are able to have access to a database 3 in which information relating to e.g. the geographical data of the area covered by the access point 20, information on the spectrum usage within the area etc. can be stored.

FIG. 10a illustrates an example embodiment of the database apparatus 2. The database 3 is, for example, stored in a memory 4 which can store information and in which the information or parts of it can be amended, if necessary. It is also possible that the database 3 is external to the database apparatus 2 wherein the database apparatus 2 has an interface for accessing the database 3 to e.g. read data from the database 3 and to store data to the database 3. The memory 4 can comprise one or more disk drives, semiconductor device(s) and/or other data carriers. The database apparatus 2 has a controller 5 to control the operation of the database apparatus 2. The memory 4 may contain a program code 4.2 i.e. instructions for the controller 5 to cause the database apparatus to perform its operation. The database apparatus 2 also comprises communication means 6 such as a transmitter 6.1 and a receiver 6.2 i.e. a transceiver to communicate with other database apparatuses 2 and other devices. The communication means 6 may comprises more than one transmitter 6.1 and receiver 6.2 to communicate with different devices or the communication means 6 may be capable of communicating with different kind of devices using the same transmitter 6.1 and the receiver 6.2. The database apparatus 2 may also comprise a user interface 7 to enter data from a user, display data to the user, modify some parameters of the operation of the database apparatus 2 etc.

The database apparatus 2 may store into the database 3 information relating to the spectrum usage and information of the geographical area(s) to which the spectrum usage information relates to. The geographical information can contain coordinate data (e.g. latitude and longitude); data on a country; city; a centre point and a radius of an area; and/or other kind of data which determines a geographical area A. The database 3 may also comprise geographical data and spectrum data of more than one area A as will be described later in this application.

The system 1 comprises a regulator apparatus 8 which can communicate with the database apparatuses 2. A regulator body such as FCC can use the regulator apparatus 8 to e.g. perform oversight on the databases. This may include functionalities such as monitoring the database performance, viewing the data and reports stored on the databases 3 and requesting status of actions from the databases 3. An example embodiment of the regulator apparatus 8 is depicted in FIG. 10b. The regulator apparatus 8 comprises a memory 9 for storing information. The regulator apparatus 8 has a controller 10 to control the operation of the regulator apparatus 8. The memory 9 may also contain a program code 9.2 i.e. instructions for the controller 10 to cause the regulator apparatus 8 to perform its operation. The regulator apparatus 8 also comprises communication means 11 such as a transmitter 11.1 and a receiver 11.2 to communicate with database apparatuses 2. The regulator apparatus 8 may also comprise a user interface 12 to enter data from a user, display data to the user, modify some parameters of the operation of the regulator apparatus 8 etc.

The system 1 may also comprise one or more usage database apparatuses 40, which may contain information of users of the frequency spectrum. For example, TV broadcasters may provide data to the usage database apparatus 40 which indicates the channel(s) the TV broadcaster uses. The data may also contain data on transmission power, antenna directions, time of transmissions, etc. An example embodiment of the usage database apparatus 40 is depicted in FIG. 10c. The usage database apparatus 40 comprises a memory 41 which may contain a usage database 42 to store information of users of the frequency spectrum within a geographical area. The usage database 42 may contain information relating to a channel structure of a frequency spectrum within a geographical area. For example, the channel structure may define which frequencies are available for each channel and for which purpose (e.g. TV broadcasting, radio broadcasting, which channels are licensed, which are license-free etc. The usage database apparatus 40 has a controller 43 to control the operation of the usage database apparatus 40. The memory 41 may contain a program code 41.2 i.e. instructions for the controller 43 to cause the usage database apparatus 40 to perform its operation. The usage database apparatus 40 also comprises communication means 44 such as a transmitter 44.1 and a receiver 44.2 to communicate with database apparatuses 2. The usage database apparatus 40 may also comprise a user interface 45 to enter data from a user, display data to the user, modify some parameters of the operation of the usage database apparatus 40 etc. The usage database apparatuses 40 may provide spectrum information to the database apparatuses 2 so that the database apparatuses 2 are aware of the details of the white space bands (channels) at a certain geographical location.

Figure 10D:
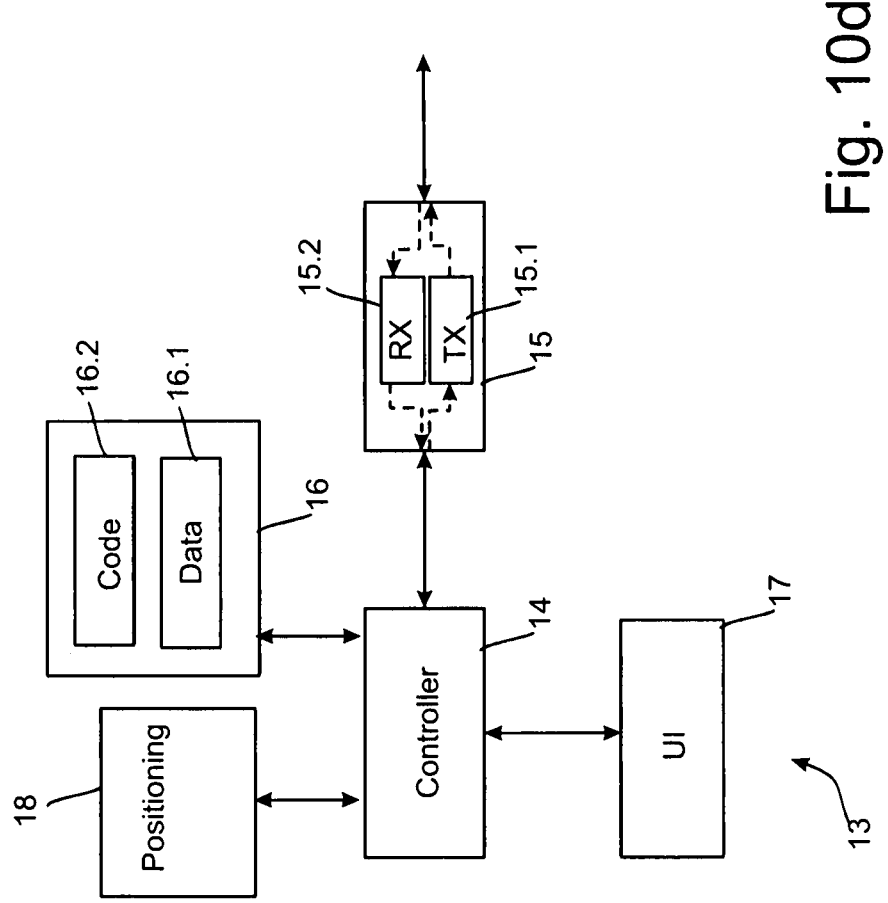
FIG. 10d depicts an example embodiment of a white space device.
Figure 10E:
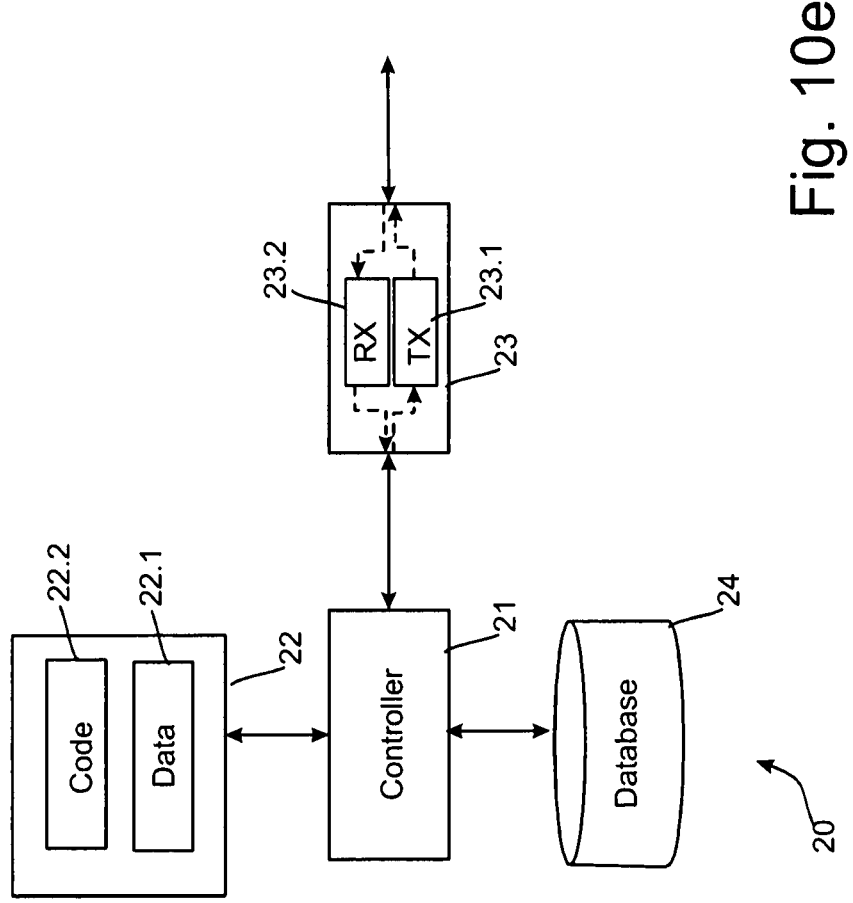
FIG. 10e depicts an example embodiment of an access point apparatus.

The system 1 may also comprise white space devices 13 which are capable of transmitting and/or receiving information using a channel at one or more white space parts of a frequency spectrum. An example embodiment of the white space device 13 is depicted in FIG. 10d. The white space device 13 comprises a controller 14 for controlling the operation of the white space device 13. The white space device 13 also comprises communication means 15 for communicating with other devices. For example, the white space device 13 may communicate with other white space devices 13, with one or more database apparatuses 2, with an access point 20 of a communication network, etc. The communication with other device(s) may be one-way communication or two-way communication. An example of the one-way communication is a white space device 13 operating as a wireless microphone wherein the acoustic sound received by the wireless microphone is converted into electrical signals and wirelessly transmitted to another device. The wireless microphone and other white space devices utilising one-way communication may still be capable of receiving data such as queries from e.g. the database apparatuses 2. An example of the two-way communication is a white space device 13 operating as a wireless head-set which capable of transmitting microphone signals to another device and receiving loudspeaker signals from the other device and transforming the loudspeaker signals into acoustic sound. The white space device may also comprise a memory 16 to store program code for the controller 14 and other data.

The white space device 13 may also comprise a user interface 17 to enter data from a user, display data to the user, modify some parameters of the operation of the white space device 13 etc.

The white space devices 13 may further comprise a positioning element 18 to determine the location of the white space device 13 so that the white space device 13 is aware of its location (geographical location). The white space device 13 can communicate with one or more database apparatus 2 to have access to a white space database 3, which contains the latest spectrum usage information for certain places. Therefore, the white space device 13 is able to find out which channels the white space device 13 may use in communication and also to detect occupation of the bands within the white space frequency spectrum so that the white space device 13 might select such a channel which may not be disturbed or in which channel interferences from other transmissions is supposed to be at a low enough level.

It should be noted here that these examples of the white space devices 13 are non-limiting and the present invention can also be implemented with other kind of white space devices 13.

Figure 11:
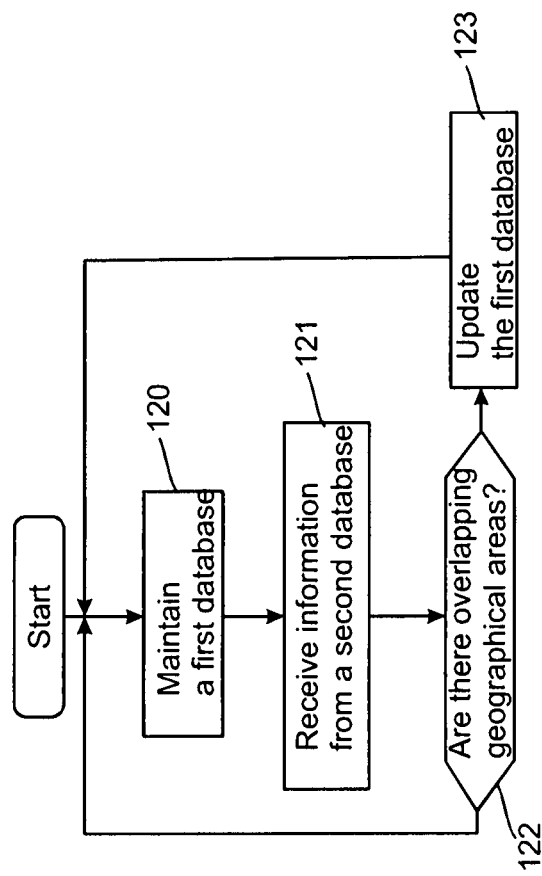
FIG. 11 depicts a flow diagram of a method according to an example embodiment of the invention.

The system 1 may also comprise one or more access point apparatuses 20 via which the white space devices 13 can communicate with other devices. An example embodiment of the access point apparatus 20 is depicted in FIG. 11e. The access point apparatus 20 can comprise a controller 21 for controlling the operation of the access point apparatus 20, and a memory 22 to store program code 22.2 for the controller and other data such as information on white space devices 13 currently attached with the access point apparatus 20. The access point apparatus 20 also comprises communication means 23 for communicating with the white space devices 13 and the database apparatuses 2. The access point apparatus 20 may also comprise a database 24 for storing information from one or more databases 3 of the database apparatuses 2.

As an example some wireless networks, which comprise access points for providing devices access to the wireless network, may have load balancing by access point load balancing scheme wherein devices being able to communicate with the wireless network have information on access points to which they can associate with and an access point can store this information on the database 3 and decide whether its load is such that requesting device can have access to the network via the access point.

In the following some example situations in which the invention can be used will be described in more detail. As shown in FIGS. 1a and 1b, there are multiple database apparatuses 2 comprising the database 3 which may contain spectrum usage information for several areas A.1, A.2, A.3. These areas A.1, A.2, A.3 of different databases may overlap with each other partially or even completely. The database apparatus 2 has interfaces with authorization parties (the regulator apparatus 8) that may carry out surveillance on the operations of the databases or provide spectrum usage information and usage apparatus(es) 40 of information-providing entities (e.g. TV broadcasting and Wireless microphone). These interfaces or connections are depicted with arrows 33, 33', 34, 34' in FIG. 1b. In addition, the database apparatus 2 has data calculation capability to calculate what channels are available at certain geographical locations.

Figure 2:
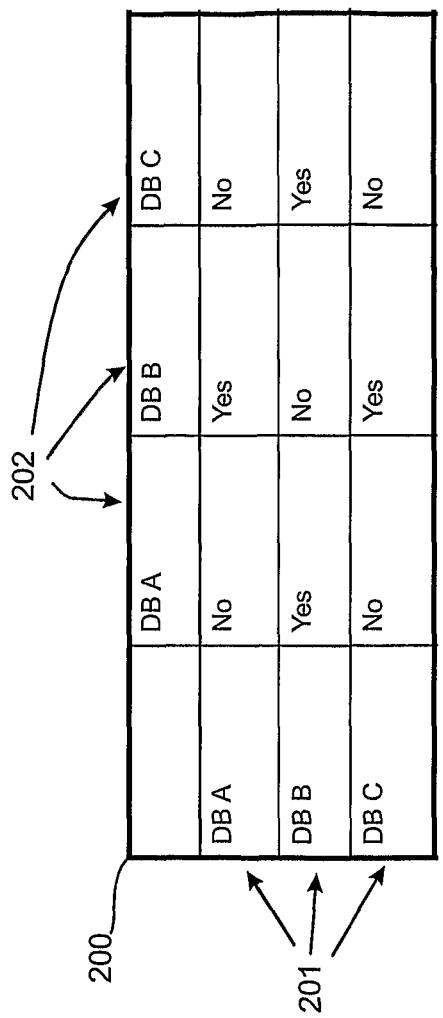
FIG. 2 illustrates an example embodiment of a linkage table for sharing access load.
Figure 5:
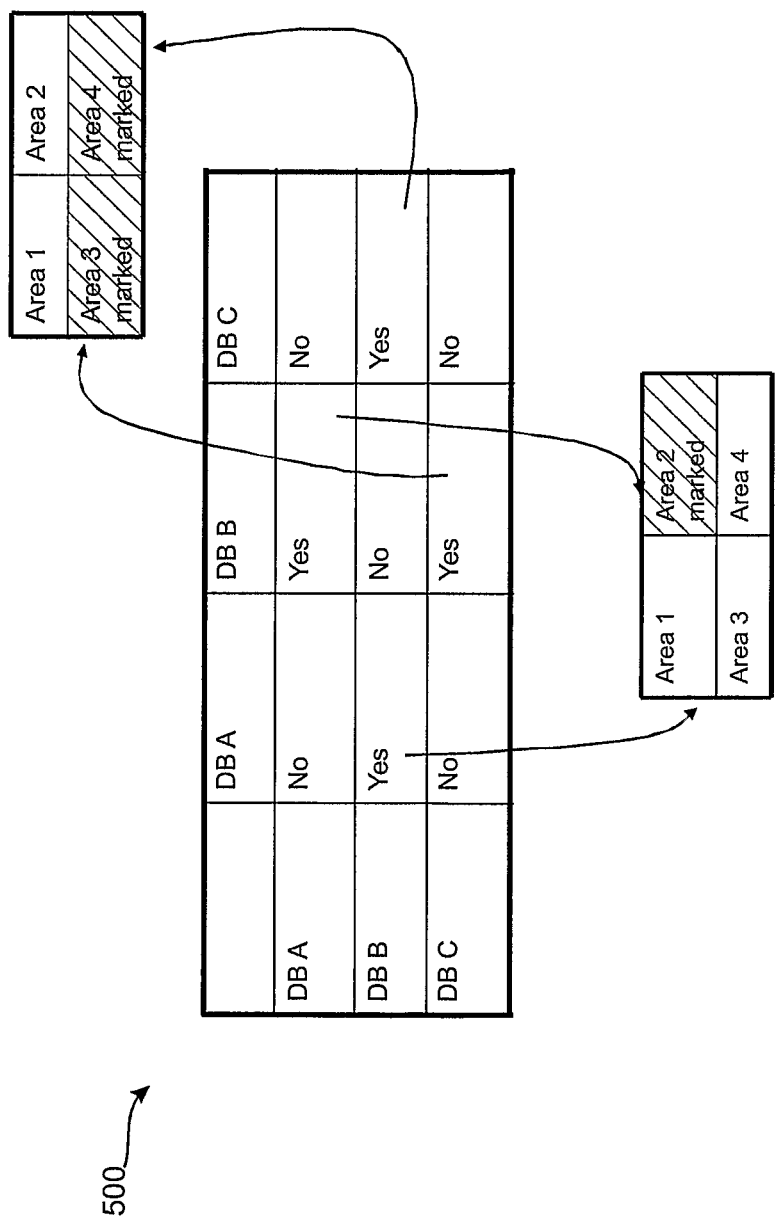
FIG. 5 depicts an example embodiment of a linkage table for sharing/cross-checking of spectrum usage information and calculation data.
Figure 7:
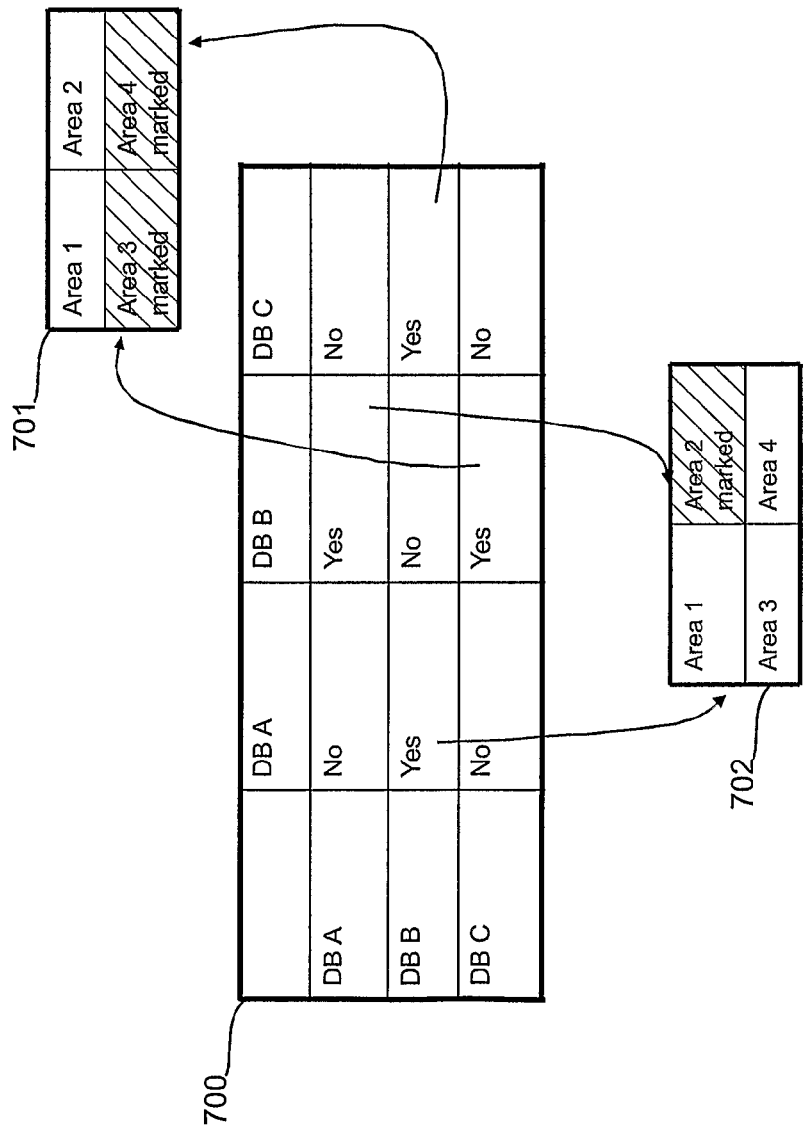
FIG. 7 depicts an example embodiment of a linkage table for resource-sharing.

In the implementation of a first embodiment of the invention two or more database apparatuses 2 initiate communication with each other and check which databases 3 can be the corresponding databases for sharing access load, depending on their processing capacity. For example, the first database apparatus 2.1 of FIG. 1b containing and maintaining 120 (FIG. 11) the first database 3.1 (database A in FIG. 1b) may send a query message to one or more other database apparatuses 2.2, 2.3, e.g. to the second database apparatus 2.2 of FIG. 1b which contains the second database 3.2 (database B in FIG. 1b). The query message indicates that the second database apparatus 2.2 is requested to inform the first database apparatus 2.1 information of processing capability of the second database apparatus 2.2 for the purpose of sharing access load, and/or the geographical information of the second database 3.2 for the purpose of resource sharing wherein the first database apparatus 2.1 can check whether there are any overlapping areas covered by the first database 3.1 and the second database 3.2. The second database apparatus 2.2 transmits the requested information to the first database apparatus 2.1 which receives 121 (FIG. 11) the information and builds or updates, for example, a linkage table 200 in which databases 3.1, 3.2 are linked. Non-limiting examples of such linkage tables are depicted in FIGS. 2, 5 and 7. The first database apparatus 2.1 examines the received data to determine 122 whether the first database 3.1 and the second database 3.2 contain overlapping areas. If so, the first database apparatus 2.1 marks 123 such areas in the linkage table 200. An example of the linkage table 200 is depicted in FIG. 2 in which a cell containing the word "yes" illustrates that resource sharing might be possible and a cell containing the word "no" illustrates that resource sharing is not possible. The rows 201 and columns 202 of the linkage table 200 comprise query results from different database apparatuses 2.1, 2.2, 2.3. In this example of the linkage table 200 the cell at the first row/second column illustrates that the first database apparatus 2.1 and the second database apparatus 2.2 can share access load when necessary. Similarly, the cell at the first row/third column illustrates that the first database apparatus 2.1 and the second database apparatus 2.2 cannot share access load. The cell at the second row/third column illustrates that the second database apparatus 2.2 and a third database apparatus 2.3 can share access load when necessary.

On the basis of the example of FIG. 1*a* it can be seen that the first area A.1 under control of the first database apparatus 2.1 and the second area A.2 under control of the second database apparatus 2.2 are partially overlapping. Therefore, the first database apparatus 2.1 and the second database apparatus 2.2 may be able to share resources when necessary. Similarly, the third area A.3 under control of the second database apparatus 2.2 and the fourth area A.4 under control of the third database apparatus 2.3 are partially overlapping thus providing a possibility to share resources between the second database apparatus 2.2 and the third database apparatus 2.3.

The linkage table 200 can be constructed in the memory 4 of the database apparatuses 2.1, 2.2, 2.3 in many ways which is known as such. In a non-limiting embodiment the values in the cells are indicated as bits wherein a first value, e.g. 0, indicate that the sharing is not possible, and a second value. e.g. 1, indicate that the sharing is possible.

In the example of FIG. 2 the linkage table 200 contains cross reference data of the sharing possibilities between the first database apparatus 2.1 and the second database apparatus 2.2, cross reference data between the first database apparatus 2.1 and the third database apparatus 2.3, and cross reference data between the second database apparatus 2.2 and the third database apparatus 2.3. In some embodiments the linkage table 200 of the first database apparatus 2.1 may only contain cross reference data of the sharing possibilities between the first database apparatus 2.1 itself and other database apparatuses 2.2 which have at least partly overlapping areas with the first database apparatus 2.1 but no cross reference data between other two database apparatuses 2.2, 2.3.

When the linkage table 200 has been formed the database apparatuses 2.1, 2.2 2.3 monitor the access load from white space devices 13 with an overload condition 300. The overload condition may contain a threshold or a trigger (shown in FIG. 3) which is compared with a current loading situation. If the condition is fulfilled, the database apparatus 2 examines the linkage table 200 to determine whether there are other database apparatuses 2.2, 2.3 with which access load can be shared. If so, the database apparatus 2 begins to negotiate with another database apparatus 2.2, 2.3 with which the sharing might be possible. The database apparatus 2.1, 2.2, 2.3 may comprise a monitoring element 210 for performing the monitoring, a comparator 211 for performing the comparison, an examining element 212 for performing the examining, and a calculating element 213 for performing the calculation. These elements may be implemented as a program code of the controller 5, as circuit elements, or as a combination of these.

Figure 3:
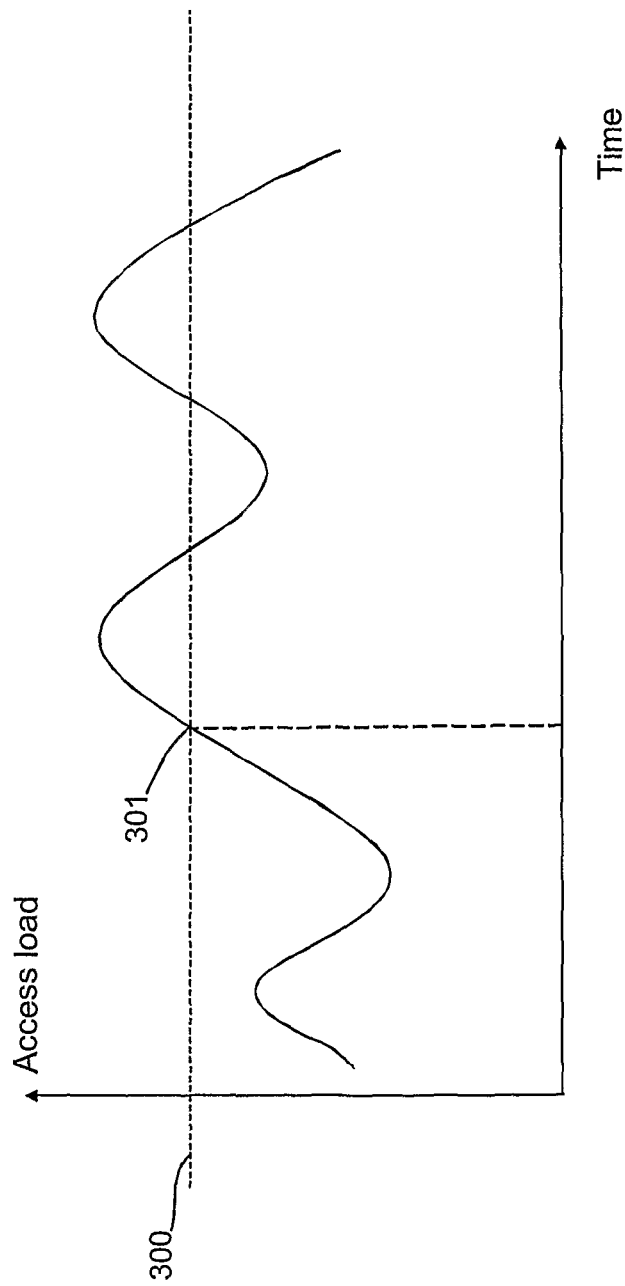
FIG. 3 depicts access load and overload trigger in an example situation.

An example of an access load situation is depicted in FIG. 3. It can be seen that the access load may vary in time and at a certain moment 301 the access load may exceed the threshold which can trigger the negotiation of sharing access load with other database apparatus(es) 2.

Figure 4:
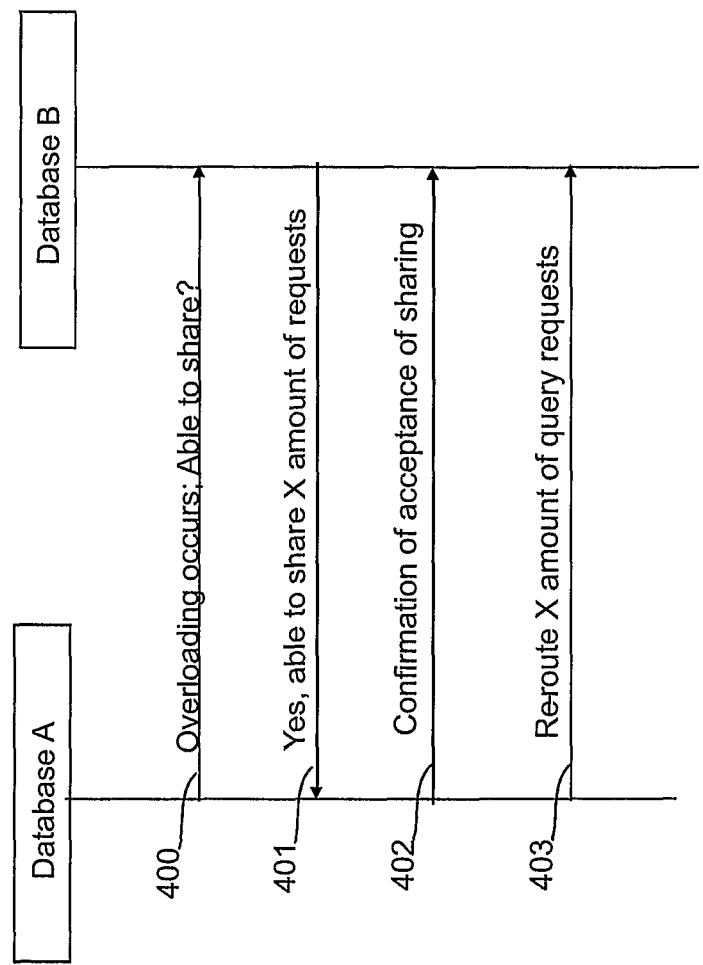
FIG. 4 depicts an example embodiment of a signalling flow for sharing access load.

An example of the signalling flow of the negotiation phase is shown in FIG. 4. When the first database apparatus 2.1 detects the overloading situation, it transmits a query message 400 to one of the other database apparatuses 2.2, 2.3 which are able to share the access load with the first database apparatus 2.1. In this non-limiting example the linkage table 200 indicates that the second database apparatus 2.2 may be able to share the access load. Therefore, the query message 400 is transmitted to the second database apparatus 2.2 which receives the query message and examines its contents. The second database apparatus 2.2 determines that the first database apparatus 2.1 wants the second database apparatus 2.2 to share the access load. The second database apparatus 2.2 examines its own access load and processing capacity and determines whether the second database apparatus 2.2 is able to share the access load and how much it can share the access load. The access load may be defined, for example, as the amount of query requests from white space devices 13. If the second database apparatus 2.2 determined that it is able to share the access load, the second database apparatus 2.2 transmits a reply message 401 to the first database apparatus 2.1 to indicate that the second database apparatus 2.2 can share a certain amount of access requests. Also in a situation in which the second database apparatus 2.2 determines that it is not able to share resources (for example, the second database apparatus 2.2 is also using its whole capacity), the second database apparatus 2.2 may transmit a reply message to the first database apparatus 2.1 to indicate that the second database apparatus 2.2 cannot momentarily share any access requests. The first database apparatus 2.1 receives the reply message 401 and transmits a confirmation message 402 to the second database apparatus 2.2. Then, the first database apparatus 2.1 re-routes 403 some query requests (e.g. from white space device(s) 13) to the second database apparatus 2.2. The number of re-routed query requests can be the same as or less than the number of query requests indicated by the second database apparatus 2.2.

The above described operation can be repeated continuously or when necessary.

In the following another example situation will be described in more detail. As with the first example situation described above, the database apparatuses 2 initiate communications with each other and check which databases 3 can be the corresponding databases 3 for sharing calculation data and cross-checking. The areas for sharing and/or cross-checking are marked and stored in a linkage table 500 (shown in FIG. 5). This is different from the initiation of the previous embodiment because it is possible that some databases may contain the spectrum usage information and calculation data for the same area. For these areas, the cross-checking is needed because different database apparatuses 2 may use different calculation methods and there may be deviations of calculation data (i.e., available channels at certain geographical locations). It is also possible that some databases may contain the spectrum usage information and calculation data for different areas. By cooperating with each other (sharing the spectrum usage information and calculation data), the database apparatuses 2 are able to cover a much larger area than the areas individual databases 3.1, 3.2 can cover.

The table 500 indicates which areas may provide a possibility to share calculation data and cross-check. For example, the cell at the second row, first column (and, respectively, at the first row, second column) indicate that the first database apparatus 2.1 and the second database apparatus 2.2 have one overlapping area (the second area A.2). The second area A.2 is overlapping i.e. white space devices 13 operating within the second area A.2 may be able to communicate with the first database apparatus 2.1 and the second database apparatus 2.2. Respectively, the cell at the third row, second column (and, respectively, at the second row, third column) indicate that the second database apparatus 2.2 and the third database apparatus 2.3 have two overlapping areas (the third area A.3 and the fourth area A.4).

In practical implementations the number of database apparatuses 2 may be quite large wherein it may not be reasonable to arrange communication between each database apparatus 2 but there may be arrangements which indicate to one database apparatus 2.1 with which other database apparatus(es) 2.2, 2.3 it may have at least partly overlapping geographical areas.

Therefore, in one example embodiment only such database apparatuses 2 which have at least partly overlapping geographical areas are arranged to communicate with each other.

Figure 6:
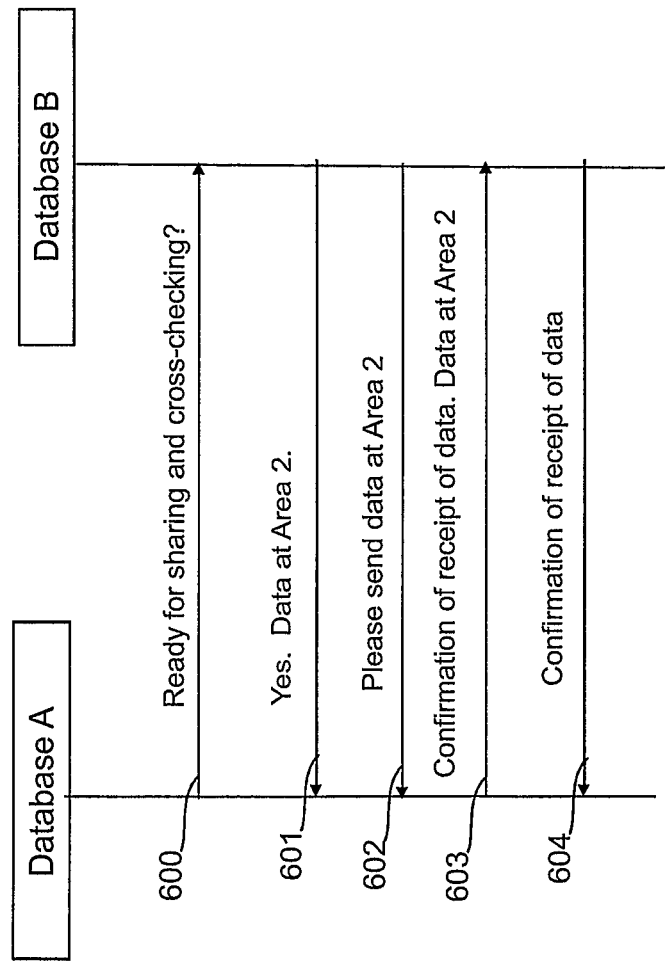
FIG. 6 depicts an example embodiment of a signalling flow for sharing calculation data and cross-checking.

The database apparatus 2 calculates available channels in a frequency spectrum associated with geographical locations in its areas. After finishing the calculation, the database apparatus 2 communicates with the corresponding other database apparatuses 2 according to the linkage table 500. An example of the signalling flow is shown in FIG. 6. When the first database apparatus 2.1 detects that it may need to share calculation data and perform cross-checking (e.g. when the first database apparatus 2.1 has finished the calculation), it transmits a query message 600 to one of the other database apparatuses 2.2, 2.3 to ask whether the other database apparatus 2.2, 2.3 is ready for sharing calculation data and perform cross-checking. In this non-limiting example the query message is transmitted to the second database apparatus 2.2 which receives the query message 600 and examines its contents. The second database apparatus 2.2 determines that the first database apparatus 2.1 wants to share the calculation data and perform the cross-checking. The second database apparatus 2.2 examines its own status and if it is ready for sharing calculation data and perform cross-checking, it transmits a reply message 601 to the first database apparatus 2.1 to indicate that the second database apparatus 2.2 can share the calculation data and performs the cross-checking. The second database apparatus 2.2 also transmits, in the same message 601 or as a separate message 602 a request of data of a certain area or of a plurality of areas, for example data at the second area A.2 of FIG. 1b. The first database apparatus 2.1 receives the reply message 601 and the request message 602 and transmits a confirmation message 603 to the second database apparatus 2.2. The first database apparatus 2.1 also transmits the requested data either in the confirmation message 603 as indicated in FIG. 6, or in a separate message. The second database apparatus 2.2 receives the confirmation message 603 and the requested data and may then transmit a confirmation message 604 of the receipt of the requested data. The second database apparatus 2.2 also updates the database 3.2 according to the received data.

Figure 8:
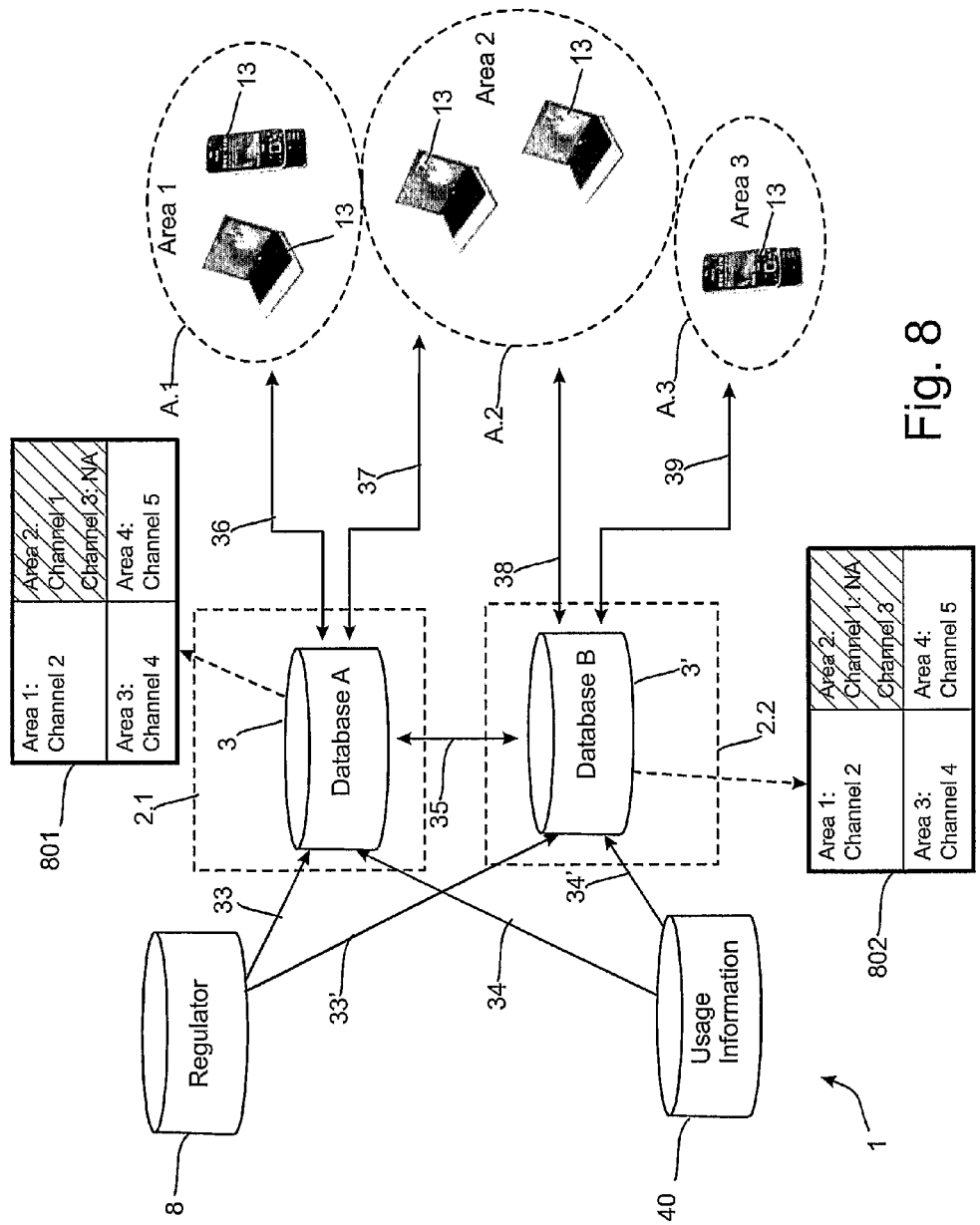
FIG. 8 depicts an example embodiment of resource sharing.

In the following an example implementation of the third embodiment of the present invention is described. The database apparatuses 2 initiate communication with each other and check if there are overlapping areas according to the geographical location information. Checking of overlapping areas is in a way similar to comparing maps stored in databases. All overlapping areas are marked and the results are used to build a linkage table 700, 701, 702 of which an example is shown in FIG. 7. According to the linkage table 700, the database apparatus 2 communicates with other corresponding database apparatuses 2 to start resource coordination. As an example in FIG. 7, the first database apparatus 2.1 and the second database apparatus 2.2 has the overlapping area A.2 (marked with hatch in the tables 701, 702 in FIG. 7) but the first database apparatus 2.1 and the third database apparatus 2.3 have no overlapping areas. Then the first database apparatus 2.1 and the second database apparatus 2.2 can communicate and coordinate without involvement of the third database apparatus 2.3. The coordination can be done in such a way that spectrum resources are split randomly or evenly among multiple databases 3 for the overlapping areas. The resources can be, for example, channels as illustrated in channel tables 801, 802 in FIG. 8. For example, as shown in FIG. 8, for the overlapping second area A.2, there are initially two available channels (channels 1 and 3). The coordination may be done so that the channel 1 is allocated for the first database apparatus 2.1 and the channel 3 is allocated for the second database apparatus 2.2 for the second area A.2.

The coordination may be implemented e.g. in such a way that the first database apparatus 2.1 determines which are the overlapping areas and selects spectrum resources it intends to use in the overlapping area and transmits an indication of the selected spectrum resources to the other database apparatuses 2.2, 2.3 which have overlapping area(s) with the first database apparatus 2.1. The other database apparatuses 2.2, 2.3 may then select different spectrum resources for use in the overlapping area and send indication of the selected spectrum resources to the other database apparatuses. It is obvious that there are also other possibilities to conduct the coordination of the spectrum resources.

If there is a need to re-coordinate, the operation described above may be repeated from the communication phase.

Figure 9:
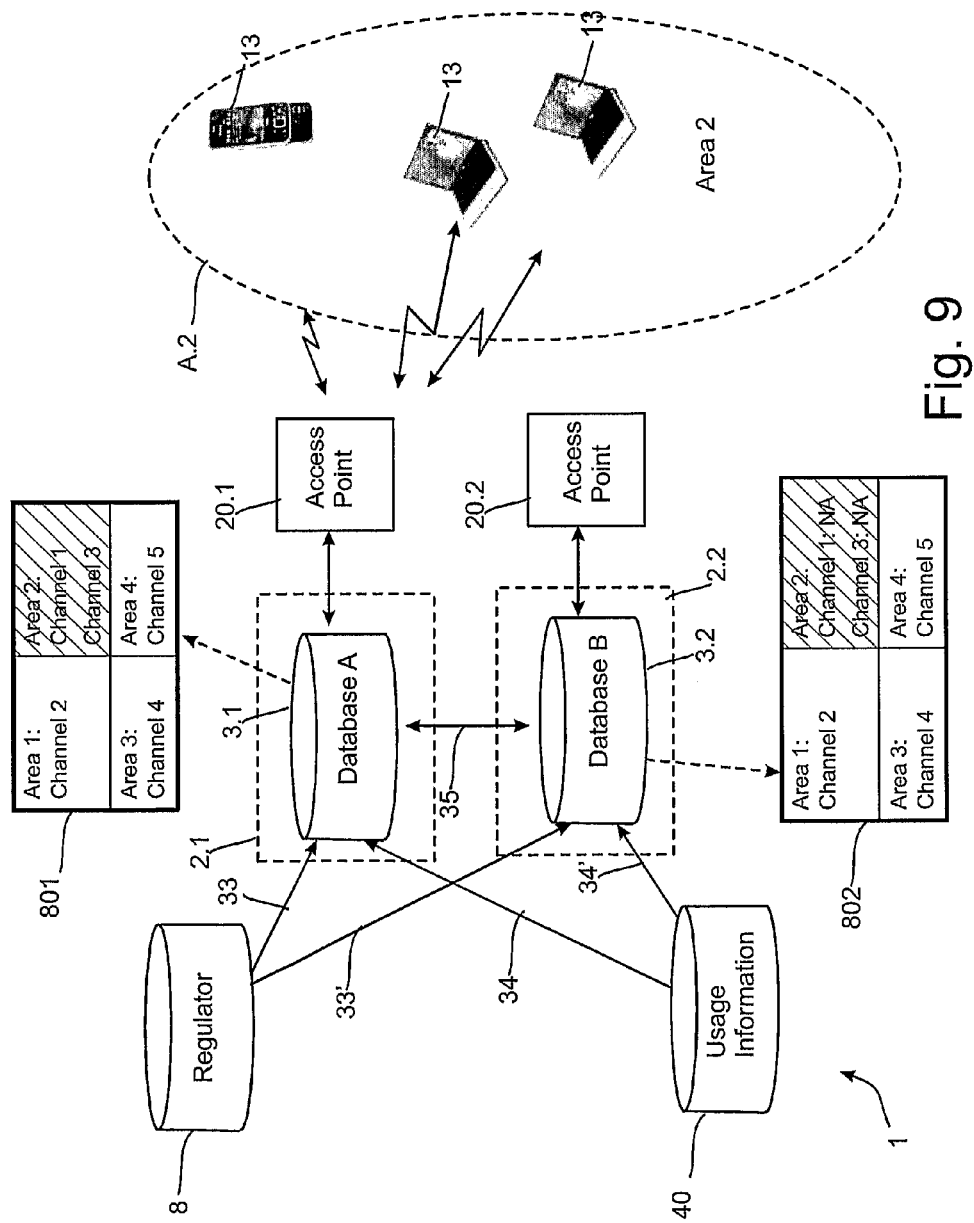
FIG. 9 illustrates an example of database coordination by using reports from access point apparatuses.

In the following another example implementation of the third embodiment of the present invention is described. The database apparatuses 2 initiate communication with each other and check if there are overlapping areas according to the geographical location information. Checking of overlapping areas is in a way similar to comparing maps stored in databases. All overlapping areas are marked and the results are used to build linkage tables 700, 701, 702 of which an example is shown in FIG. 7. The database apparatuses 2 send requests for reporting spectrum use activity to the corresponding access point apparatuses 20 in the marked areas. The access point apparatuses 20 measure the spectrum use activity (e.g., the number of connected or idle white space devices 13 in the coverage area of the access point apparatus 20) and report the measured spectrum use activity to the database apparatuses 2. It is also possible that the access point apparatuses 20 send the reports on spectrum use activity intermittently (i.e., with intervals). Then, based on the activity-reporting and the linkage tables 700, 701, 702 established previously, the database apparatuses 2 communicate with each other and coordinate to share spectrum resources in proportion to the spectrum use activity at access point apparatuses 20. For example, as shown in FIG. 9, at the overlapping second area A.2, if the spectrum use activity of the first access point apparatus 20.1 is relatively high and the spectrum use activity of the second access point apparatus 20.2 is very small, the second database apparatus 2.2 can temporarily give (release) all spectrum resources (the channel 1 and the channel 3 in this example) to the first database apparatus 2.1. The second database apparatus 2.2 may transmit an indication of the released spectrum resources to the first database apparatus 2.1.

The above described operations can be implemented in software, in hardware or both in software and hardware. For example, the controllers of the apparatuses 2, 8, 13, 20 can perform certain tasks, for example, control the operation of the communication means to transmit and receive messages, store information on received messages into the memory, read information from the memory to determine e.g. common areas, calculate channel information etc. The controllers can also build messages into the memory from which the transmitters can read the messages and convert them to communication signals and transmit the communication signals to other apparatus(es).

The white space device 13 may for example be a mobile terminal, a user equipment of a wireless communication system, any other communication device, as well as a personal computer, a wireless microphone, a wireless headset, etc.

The controller 5 may be a processor, a microprocessor, a micro-controller etc. which may be configured to execute various program codes. The implemented program codes may comprise encoding code routines. The implemented program codes 4.2 may further comprise resource calculation, geographical area coverage calculation etc. code routines. The implemented program codes may be stored for example in the memory 4 for retrieval by the processor whenever needed. The memory 4 may further provide a section 4.1 for storing data.

The user interface 7 may enable a user to input commands to the database apparatus 2, for example via a keypad (not shown), and/or to obtain information from the database apparatus 2, for example via a display (not shown). The transceiver 6 enables communication with other electronic devices, for example via a wireless communication network. The transceiver 6 may in some embodiments of the invention be configured to communicate to other electronic devices by a wired connection.

It is to be understood again that the structure of the database apparatuses 2, the regulator apparatuses 8, the white space devices 13, access point apparatuses 20 and the usage database apparatuses 40 could be supplemented and varied in many ways. As an example, there may be additional functional elements in addition to those shown in the Figures or some of the elements illustrated in the Figures may be omitted. As another example, the apparatuses and/or devices may comprise one or more processors and/or one or more memory units, although depicted as a single processor and a single memory unit in the Figures.

As used in this application, the term 'circuitry' refers to all of the following:
(a) to hardware-only circuit implementations (such as implementations in only analog and/or digital circuitry) and
(b) to combinations of circuits and software (and/or firmware), such as: (i) to a combination of processor(s) or (ii) to portions of processor(s)/software (including digital signal processor(s)), software, and memory(ies) that work together to cause an apparatus, such as a mobile phone, a server, a computer, a music player, an audio recording device, etc, to perform various functions) and
(c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

The invention is not solely limited to the above described embodiments but it can be varied within the scope of the appended claims.

The invention claimed is:

1. A method comprising:
    maintaining a first database containing information of a usage of a frequency spectrum for a first geographical area by a first database apparatus;
    receiving information from a second database apparatus that includes a second database for a second geographical area;
    receiving information specifying a processing capability for the second database apparatus, wherein the processing capability includes information specifying (i) an access load, and (ii) geographical information for the second database;
    determining by the first database apparatus whether said first geographical area and said second geographical area are at least partly overlapping; and
    maintaining a linkage table in which an indication is provided on the result of the determining.

2. The method according to claim 1 comprising:
    monitoring by said first database apparatus an access load of the first database apparatus; and
    comparing by said first database apparatus the access load with a condition to determine whether the access load exceeds the condition.

3. The method according to claim 2 comprising:
    if the comparison indicates that the access load exceeds the condition, examining said linkage table to find out another database apparatus and if found,
    negotiating with said second database to share resources.

4. The method according to claim 3 comprising sharing the resources by rerouting a query request from a white space device to the second database apparatus.

5. The method according to claim 1 comprising using the linkage table to determine whether the first database and the second database contain overlapping areas for which the first database and the second database are able to share calculation data and cross-checking.

6. The method according to claim 5 comprising calculating by the first database apparatus which channels are available at the first geographical area; and
    sending the calculation data to the second database apparatus, if the first database and the second database are able to share calculation data and cross-checking for the first geographical area.

7. The method according to claim 1 comprising communicating by the first database apparatus with the second database apparatus to coordinate resources for an overlapping area.

8. The method according to claim 1 comprising:
    receiving by the second database apparatus a report on a spectrum use activity status of the first database apparatus;
    measuring a spectrum use activity status of the second database apparatus;
    examining by the second database apparatus said report and the result of the measurement to determine whether the second database apparatus can release spectrum resources for use of the first database apparatus, and if so,
    transmitting by the second database apparatus an indication of the released resources to the first database apparatus.

9. The method according to claim 1 comprising:
    transmitting by the second database apparatus a request to the first database apparatus to send said report on the spectrum use activity status of the first database apparatus.

10. An apparatus comprising one or more processors and one or more memories including computer program code, the one or more memories and the computer program code being configured, with the one or more processors, to cause the apparatus to perform at least the following:
    communicating with a first database containing information of a usage of a frequency spectrum for a first geographical area;
    communicating with a second database apparatus that includes a second database for a second geographical area, wherein the communicating includes receiving to receive information from the second database apparatus specifying a processing capability for the second database apparatus, wherein the processing capability includes information specifying (i) an access load, and (ii) geographical information for the second database; and determining whether said first geographical area and said second geographical area are at least partly overlapping and for maintaining a linkage table in which an indication is provided on the result of the determining.

11. The apparatus according to claim 10 comprising:
a monitor for monitoring an access load of the apparatus; and
a comparator for comparing the access load with a condition to determine whether the access load exceeds the condition.

12. The apparatus according to claim 11 comprising:
an examining element examining said linkage table to find out another database apparatus, if the comparison indicates that the access load exceeds the condition; and if found,
the apparatus is configured for negotiating with said second database to share resources.

13. The apparatus according to claim 12 configured for rerouting a query request from a white space device to the second database apparatus to share the resources with the second database apparatus.

14. The apparatus according to claim 10 configured for using the linkage table to determine whether the first database and the second database contain overlapping areas for which the first database and the second database are able to share calculation data and cross-checking.

15. The apparatus according to claim 14 comprising a calculating element for calculating which channels are available at the first geographical area; and for sending the calculation data to the second database apparatus, in response to the first database and the second database being able to share calculation data and cross-checking for the first geographical area.

16. The apparatus according to claim 10 wherein said transceiver is configured for communicating with the second database apparatus to coordinate resources for an overlapping area.

17. A computer program product comprising a computer program code stored in a non-transitory computer readable memory and configured, with at least one processor, to cause an apparatus to:
maintain a first database containing information of a usage of a frequency spectrum for a first geographical area;
receive information from a second database apparatus on a second geographical area;
receive information specifying a processing capability for the second database apparatus, wherein the processing capability includes information specifying (i) an access load, and (ii) geographical information for the second database;
determine whether said first geographical area and said second geographical area are at least partly overlapping; and
maintain a linkage table in which an indication is provided on the result of the determining.

* * * * *